US012024202B2

(12) United States Patent
Choi et al.

(10) Patent No.: US 12,024,202 B2
(45) Date of Patent: Jul. 2, 2024

(54) AUTONOMOUS VEHICLE LOCATION PROVIDING APPARATUS AND METHOD THEREOF

(71) Applicants: HYUNDAI MOTOR COMPANY, Seoul (KR); Kia Corporation, Seoul (KR)

(72) Inventors: Jae Kyung Choi, Changwon-si (KR); Yong Seok Jeong, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 331 days.

(21) Appl. No.: 17/545,349

(22) Filed: Dec. 8, 2021

(65) Prior Publication Data

US 2022/0402526 A1    Dec. 22, 2022

(30) Foreign Application Priority Data

Jun. 16, 2021    (KR) .......................... 10-2021-0078219

(51) Int. Cl.
*B60W 60/00*    (2020.01)
*H04W 4/029*    (2018.01)
*H04W 4/48*    (2018.01)

(52) U.S. Cl.
CPC ...... *B60W 60/00253* (2020.02); *H04W 4/029* (2018.02); *H04W 4/48* (2018.02)

(58) Field of Classification Search
CPC . B60W 60/00253; H04W 4/029; H04W 4/48; H04W 4/40; H04W 4/80; H04M 1/72412
See application file for complete search history.

(56) References Cited

U.S. PATENT DOCUMENTS

| | | | | |
|---|---|---|---|---|
| 10,884,412 | B2 * | 1/2021 | Yoon | B60K 35/00 |
| 11,074,664 | B1 * | 7/2021 | John | G01S 5/14 |
| 11,267,487 | B2 * | 3/2022 | Suzuki | G05D 1/0038 |
| 11,312,331 | B2 * | 4/2022 | Eathakota | G06Q 10/0832 |
| 2021/0403055 | A1 * | 12/2021 | Jeromin | G06V 20/56 |
| 2022/0135082 | A1 * | 5/2022 | Dumas | G08G 1/133 |
| | | | | 701/26 |

\* cited by examiner

*Primary Examiner* — John A Tweel, Jr.
(74) *Attorney, Agent, or Firm* — MORGAN, LEWIS & BOCKIUS LLP

(57) ABSTRACT

An autonomous vehicle location providing apparatus for providing a location of an autonomous vehicle which travels to a location of a user depending on a call of the user and a method thereof are provided. The autonomous vehicle location providing apparatus receives a call, a call location, and user information from a user's terminal and communicates with the user's terminal around an autonomous vehicle corresponding to the user information, while the autonomous vehicle travels to the call location depending on the call. The autonomous vehicle location providing apparatus provides a location of the autonomous vehicle which travels to a location of the user depending on a call of the user to recognize a customer who calls an auto-taxi.

20 Claims, 7 Drawing Sheets

Fig.7

AUTONOMOUS VEHICLE LOCATION PROVIDING APPARATUS AND METHOD THEREOF

CROSS-REFERENCE TO RELATED APPLICATION

This application claims the benefit of priority to Korean Patent Application No. 10-2021-0078219, filed in the Korean Intellectual Property Office on Jun. 16, 2021, the entire contents of which are incorporated herein by reference.

TECHNICAL FIELD

The present disclosure relates to an autonomous vehicle location providing apparatus and a method thereof, and more particularly, relates to an autonomous vehicle location providing apparatus for providing a location of an autonomous vehicle which travels to a location of a user depending on calling of the user and a method thereof.

BACKGROUND

An autonomous vehicle refers to a vehicle which recognizes a driving environment by itself to determine risk, controls its driving route to minimize driving manipulation of a driver, and drives itself. As a result, the autonomous vehicle refers to a vehicle capable of performing driving, steering, and parking without influence of a person. The autonomous vehicle may be used as an auto-taxi by means of fully autonomous driving.

However, the autonomous vehicle used as the auto-taxi by means of the fully autonomous driving has a limitation in recognizing a user who calls the autonomous vehicle. Furthermore, a method capable of overcoming immaturity of the user in conjunction with setting the called autonomous vehicle is insufficient. Meanwhile, there is a technology of using an application of a smartphone as a smart key of the vehicle depending on development of the smartphone technology. There is a need for a method capable of grafting the technology into an auto-taxi technology through autonomous driving to improve convenience of the user.

The information disclosed in the Background section above is to aid in the understanding of the background of the present disclosure, and should not be taken as acknowledgement that this information forms any part of prior art.

SUMMARY

The present disclosure has been made to solve the above-mentioned problems occurring in the prior art while advantages achieved by the prior art are maintained intact.

An aspect of the present disclosure provides an apparatus and a method for providing a location of an autonomous vehicle which travels to a location of a user depending on a call of the user.

Another aspect of the present disclosure provides an autonomous vehicle location providing apparatus for recognizing a customer who calls an auto-taxi and a method thereof.

Another aspect of the present disclosure provides an autonomous vehicle location providing apparatus for overcoming immaturity of the user in conjunction with setting the called autonomous vehicle and a method thereof.

Another aspect of the present disclosure provides an autonomous vehicle location providing apparatus for addressing a problem, when an error occurs in identifying a location of the user due to movement of the user, an error in GPS information, or the like and a method thereof.

Another aspect of the present disclosure provides an autonomous vehicle location providing apparatus for accurately identifying a service end time, when the user ends the use of the called autonomous vehicle and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an autonomous vehicle location providing apparatus may include a communication device that is provided in an autonomous vehicle and receives a call, a call location, and user information from a user's terminal, a short range communication device that is provided in the autonomous vehicle and communicates with a terminal around the autonomous vehicle, and a controller that performs communication with the user's terminal corresponding to the user information, via the short range communication device, while the autonomous vehicle travels to the call location depending on the call.

In an embodiment, the short range communication device may communicate with the terminal around the autonomous vehicle, by means of Bluetooth or Bluetooth low energy.

In an embodiment, the controller may display information about a distance between the autonomous vehicle and a user, the distance being calculated based on a received signal strength indicator (RSSI) of the communication with the user's terminal via the short range communication device, on the user's terminal.

In an embodiment, the controller may display an image obtained by means of a camera provided in the autonomous vehicle on the user's terminal, when an RSSI of the communication with the user's terminal via the short range communication device is greater than a predetermined first reference value.

In an embodiment, the controller may transmit a notification to a server which manages a call of the autonomous vehicle, via the communication device, when it is determined that the call location and a global position system (GPS)-based location of the user's terminal differ from each other depending on a predetermined criterion.

In an embodiment, the controller may grant control authority of the autonomous vehicle to a user by means of the user's terminal, when an RSSI of the communication with the user's terminal via the short range communication device is greater than a predetermined second reference value.

In an embodiment, the controller may grant the control authority of the autonomous vehicle to the user by means of the user's terminal and may display whether the control authority is granted, by means of turning on of a lamp of the autonomous vehicle.

In an embodiment, the controller may start autonomous driving of the autonomous vehicle to a destination, when a door lock of the autonomous vehicle is unlocked by means of the user's terminal and is then locked again.

In an embodiment, the controller may reclaim the control authority granted to the user, when a quick response (QR) code provided on the autonomous vehicle is tagged by means of the user's terminal, after the autonomous vehicle arrives at a destination.

In an embodiment, the controller may change a color of a mood lamp provided in the autonomous vehicle, depending on the locking of the door lock or the starting of the autonomous driving.

In an embodiment, the communication device may receive air conditioning state setting information of the autonomous vehicle together with the call from the user's terminal. The controller may control air conditioning of the autonomous vehicle, based on the received air conditioning state setting information, while the autonomous vehicle travels to the call location depending on the call.

In an embodiment, the control authority may include at least one of locking of a door lock of the autonomous vehicle, unlocking of the door lock, an alarm output, navigation control, control of a vehicle interior temperature, or music playback.

According to another aspect of the present disclosure, an autonomous vehicle location providing method may include receiving, by a communication device provided in an autonomous vehicle, a call, a call location, and user information from a user's terminal and performing, by a controller, communication with the user's terminal corresponding to the user information, via the short range communication device, while the autonomous vehicle travels to the call location depending on the call.

In an embodiment, the autonomous vehicle location providing method may further include displaying, by the controller, information about a distance between the autonomous vehicle and a user, the distance being calculated based on an RSSI of the communication with the user's terminal via the short range communication device, on the user's terminal.

In an embodiment, the autonomous vehicle location providing method may further include displaying, by the controller, an image obtained by means of a camera provided in the autonomous vehicle on the user's terminal, when an RSSI of the communication with the user's terminal via the short range communication device is greater than a predetermined first reference value.

In an embodiment, the autonomous vehicle location providing method may further include granting, by the controller, control authority of the autonomous vehicle to a user by means of the user's terminal, when an RSSI of the communication with the user's terminal via the short range communication device is greater than a predetermined second reference value.

In an embodiment, the autonomous vehicle location providing method may further include granting, by the controller, the control authority of the autonomous vehicle to the user by means of the user's terminal and displaying whether the control authority is granted, by means of turning on of a lamp of the autonomous vehicle.

In an embodiment, the autonomous vehicle location providing method may further include starting, by the controller, autonomous driving of the autonomous vehicle to a destination, when a door lock of the autonomous vehicle is unlocked by means of the user's terminal and is then locked again.

In an embodiment, the autonomous vehicle location providing method may further include reclaiming the control authority granted to the user, when a QR code provided on the autonomous vehicle is tagged by means of the user's terminal, after the autonomous vehicle arrives at a destination.

In an embodiment, the receiving of the call, the call location, and the user information from the user's terminal by the communication device may include receiving, by the communication device, air conditioning state setting information of the autonomous vehicle together with the call from the user's terminal. The autonomous vehicle location providing method may further include controlling, by the controller, air conditioning of the autonomous vehicle, based on the received air conditioning state setting information, while the autonomous vehicle travels to the call location depending on the call.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

Figure 1:
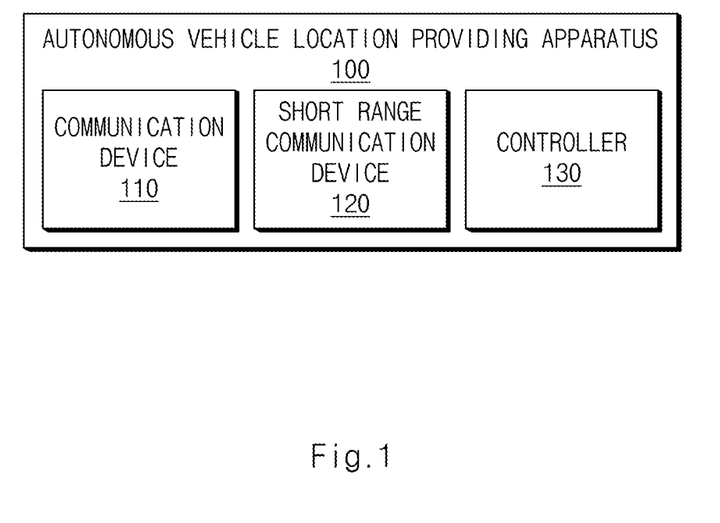
FIG. 1 is a block diagram illustrating an autonomous vehicle location providing apparatus according to an embodiment of the present disclosure.

FIG. 1 is a block diagram illustrating an autonomous vehicle location providing apparatus according to an embodiment of the present disclosure.

Referring to FIG. 1, an autonomous vehicle location providing apparatus 100 may include a communication device 110, a short range communication device 120, and a controller 130.

The autonomous vehicle location providing apparatus 100 according to an embodiment of the present disclosure may be implemented inside or outside a vehicle. In this case, the autonomous vehicle location providing apparatus 100 may be integrally configured with control units in the vehicle or may be implemented as a separate hardware device to be connected with the control units of the vehicle by a connection means.

As an example, the autonomous vehicle location providing apparatus 100 may be integrally configured with the vehicle or may be implemented as a configuration independent of the vehicle in the form of being installed/attached to the vehicle. Alternatively, a part of the autonomous vehicle location providing apparatus 100 may be integrally configured with the vehicle or the other may be implemented as a configuration independent of the vehicle in the form of being installed/attached to the vehicle.

The communication device 110 may be provided in the autonomous vehicle and may receive a call, a call location, and user information from a user's terminal. The communication device 110 may be a hardware device implemented by various electronic circuits, e.g., processor, to transmit and receive signals via wireless or wired connections.

As an example, the communication device 110 may receive a call, a call location, and user information input via the user's terminal from an external server.

As an example, the communication device 110 may communicate with a server through a wireless LAN (WLAN), wireless-fidelity (Wi-Fi), Wi-Fi Direct, digital living network alliance (DLNA), wireless broadband (WiBro), world interoperability for microwave access (WiMAX), high speed downlink packet access (HSDPA), high speed uplink packet access (HSUPA), long term evolution (LTE), long term evolution-advanced (LTE-A), or the like.

The user may input at least one of a call request for the autonomous vehicle, a call location, a destination, or user information, by means of the user's terminal to call the autonomous vehicle.

The at least one of the call request, the call location, the destination, or the user information input by the user may be transmitted to the server via the user's terminal.

The communication device 110 may receive the at least one of the call request, the call location, the destination, or the user information input by the user.

As an example, the communication device 110 may receive air conditioning state setting information of the autonomous vehicle together with the call from the user's terminal.

As an example, when the call calls the autonomous vehicle through the user's terminal, a user interface may be provided on the user's terminal to input setting information about an air conditioning state of the autonomous vehicle together.

As an example, the communication device 110 may receive the air conditioning state setting information of the autonomous vehicle, which is input by the user, via the server.

The short range communication device 120 may be provided in the autonomous vehicle and may communicate with a terminal around the autonomous vehicle. The short range communication device 120 may be a hardware device implemented by various electronic circuits, e.g., processor, to transmit and receive signals via wireless or wired connections.

As an example, the short range communication device 120 may communicate with a terminal around the autonomous vehicle, by means of Bluetooth or Bluetooth low energy.

As an example, the short range communication device 120 may communicate with a terminal around the autonomous vehicle, which is present within a specific distance from the autonomous vehicle.

The controller 130 according to an exemplary embodiment of the present disclosure may be a processor (e.g., computer, microprocessor, CPU, ASIC, circuitry, logic circuits, etc.). The processor may be implemented by a non-transitory memory storing, e.g., a program(s), software instructions reproducing algorithms, etc., which, when executed, may perform the overall control such that respective components may normally perform their own functions, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The controller 130 has an associated non-transitory memory storing software instructions which, when executed by the processor of the controller 130, provides the functionalities of may perform the overall control such that respective components may normally perform their own functions. Such a controller 130 may be implemented in the form of hardware, may be implemented in the form of software, or may be implemented in the form of a combination thereof. Preferably, the controller 130 may be implemented as, but not limited to, a microprocessor. In addition, the controller 130 may perform a variety of data processing, calculation, and the like described below.

While the autonomous vehicle travels to the call location depending on the call, the controller 130 may perform communication with the user's terminal corresponding to the user information, via the short range communication device 120.

As an example, when the autonomous vehicle is able to travel to the call location by means of autonomous driving, depending on the call, and is close within a specific distance where the autonomous vehicle is able to communicate with the user's terminal corresponding to the user information via the short range communication device 120, the controller 130 may perform communication with the user's terminal via the short range communication device 120.

As an example, the controller 130 may display information about a distance between the autonomous vehicle and the user, which is calculated based on a received signal strength indicator (RSSI) of the communication with the user's terminal via the short range communication device 120, on the user's terminal.

As an example, the controller 130 may determine that the higher the RSSI of the communication between the short range communication device 120 and the user's terminal, the closer the user who has the user's terminal is to the autonomous vehicle and may determine that the lower the RSSI of the communication between the short range communication device 120 and the user's terminal, the further the user who has the user's terminal is away from the autonomous vehicle.

Furthermore, the controller 130 may transmit a command to display information about a distance between the autonomous vehicle and the user, which is calculated based on an RSSI of communication between the short range communication device 120 and the user's terminal, which is measured by the user's terminal, on the user's terminal, via the communication device 110 or the short range communication device 120.

As an example, the controller 130 may calculate a distance between the autonomous vehicle and the user based on an RSSI of communication between the short range communication device 120 and the user's terminal and may transmit a signal or command to display information about the calculated distance to the user's terminal, via the communication device 110 or the short range communication device 120.

The user's terminal may receive and display the information about the distance between the autonomous vehicle and the user, which is calculated by means of the controller 130.

A description will be given in detail below of displaying the information about the distance between the autonomous vehicle and the user in the user's terminal with reference to FIG. 3.

As an example, when the RSSI of the communication with the user's terminal via the short range communication device 120 is greater than a predetermined first reference value, the controller 130 may display an image obtained by means of a camera provided in the autonomous vehicle on the user's terminal.

As an example, the autonomous vehicle may include the camera which obtains an image around the autonomous vehicle.

As an example, the controller 130 may be directly or indirectly connected with the camera through a wired connection or a wireless connection to receive an image around the autonomous vehicle, which is obtained by means of the camera.

As an example, as the first reference value is set to "0", when the RSSI of the communication with the user's terminal via the short range communication device 120 has a positive value, the controller 130 may transmit the image around the autonomous vehicle, which is obtained by means of the camera, to the user's terminal via the communication device 110 or the short range communication device 120 and may transmit a signal or command to display the image around the autonomous vehicle to the user user's terminal via the communication device 110 or the short range communication device 120.

The user's terminal may receive and display the image around the autonomous vehicle, which is obtained by means of the camera.

A description will be given in detail below of displaying the image around the autonomous vehicle in the user's terminal with reference to FIG. 4.

As an example, when it is determined that a call location and a global positioning system (GPS)-based location of the user's terminal differ from each other depending on a predetermined criterion, the controller 130 may transmit a notification to a server which manages a call of the autonomous vehicle, via the communication device 110.

As an example, the controller 130 may receive the GPS-based location of the user's terminal via the communication device 110 or the short range communication device 120.

As an example, when the distance between the received GPS-based location and the call location is greater than a predetermined threshold distance, the controller 130 may determine that the GPS-based location and the call location differ from each other.

As an example, when the controller 130 transmits the notification to the server which manages the call of the autonomous vehicle, the server may provide the user with information that it is determined that the GPS-based location and the call location differ from each other, via the user's terminal.

Furthermore, when the controller 130 transmits the notification to the server which manages the call of the autonomous vehicle, the server may be updated with the call location, by means of the user's terminal, and may transmit the updated call location to the communication device 110.

As an example, the autonomous vehicle may travel to the updated call location by means of autonomous driving.

As an example, when the RSSI of the communication with the user's terminal via the short range communication device 120 is greater than a predetermined second reference value, the controller 130 may grant control authority of the autonomous vehicle to the user by means of the user's terminal.

As an example, the controller 130 may grant control authority of the autonomous vehicle to the user through the user's terminal, by means of a smart key system (SMK) of the autonomous vehicle.

As an example, the SMK may be defined as a system which recognizes the user who has a smart key through low frequency (LF) or radio frequency (RF) communication such that the user inputs vehicle control including locking or unlocking of the door lock, opening and closing of the trunk, or starting.

As an example, the smart key may be implemented in the form of an application in the user's terminal.

As an example, the control authority may include at least one of locking of the door lock of the autonomous vehicle, unlocking of the door lock, an alarm output, navigation control, control of a vehicle interior temperature, or music playback.

As an example, the user may input a command for at least one of locking of the door lock of the autonomous vehicle, unlocking of the door lock, an alarm output, navigation control, control of a vehicle interior temperature, or music playback, by means of the user's terminal. The user's terminal may transmit the received command to the autonomous vehicle.

Furthermore, the controller 130 may control the autonomous vehicle based on a command for at least one of locking of the door lock of the autonomous vehicle, unlocking of the door lock, an alarm output, navigation control, control of a vehicle interior temperature, or music playback, which is received in the autonomous vehicle.

As an example, the controller 130 may grant control authority of the autonomous vehicle to the user by means of the user's terminal and may display whether the control authority is granted, by means of turning on of a lamp of the autonomous driving.

As an example, when the control authority of the autonomous vehicle is granted to the user by means of the user's terminal, the controller 130 may turn on a lamp such as a dynamic welcome light (DWL) provided in the autonomous vehicle to output an indication that the control authority is granted to the user.

As an example, when the door lock of the autonomous vehicle is unlocked by means of the user's terminal and is then locked again, the controller 130 may start autonomous driving of the autonomous vehicle to a destination.

As an example, when the door lock of the autonomous vehicle is unlocked by means of the user's terminal to which the control authority is granted and is then locked again, the controller 130 may determine that the user completes the riding of the autonomous vehicle and may start autonomous driving of the autonomous vehicle toward the destination.

As an example, after the autonomous vehicle arrives at the destination, when a quick response (QR) code provided on the autonomous vehicle is tagged by means of the user's terminal, the controller 130 may reclaim the control authority granted to the user.

As an example, the autonomous vehicle may have the QR code on the outside.

As an example, when the QR code provided on the autonomous vehicle is tagged by means of the user's terminal, the controller 130 may determine that the user alights from the autonomous vehicle, may finalize an alighting time point, and may reclaim the control authority granted to the user.

As an example, the controller 130 may change a color of a mood lamp provided in the autonomous vehicle, depending on the locking of the door lock or the starting of the autonomous driving.

As an example, the controller 130 may change the color of the mood lamp provided in the autonomous vehicle to an orange color, when the user rides in the autonomous vehicle and the door lock is locked, and may change the color of the mood lamp provided in the autonomous vehicle to a green color, when the door lock is locked and autonomous driving of the autonomous vehicle starts.

Herein, the orange color and the green color may be colors randomly set to give an example, which may be actually set to other colors.

The controller 130 may change the color of the mood lamp provided in the autonomous vehicle, depending on the locking of the door lock or the starting of the autonomous driving, such that a passenger of the autonomous vehicle may recognize a state of the autonomous vehicle.

As an example, the controller 130 may control air conditioning of the autonomous vehicle based on air conditioning state setting information received while the autonomous vehicle travels to the call location depending on the call.

As an example, the air conditioning state setting information may include setting information about at least one of a ventilation, cooling, heating or humidification state in the autonomous vehicle.

As an example, the controller 130 may control the air conditioning of the autonomous vehicle based on the air conditioning state setting information received while the autonomous vehicle travels to the call location, such that the user may ride in the autonomous vehicle with the set air conditioning state, thus providing the user with convenience.

Figure 2:
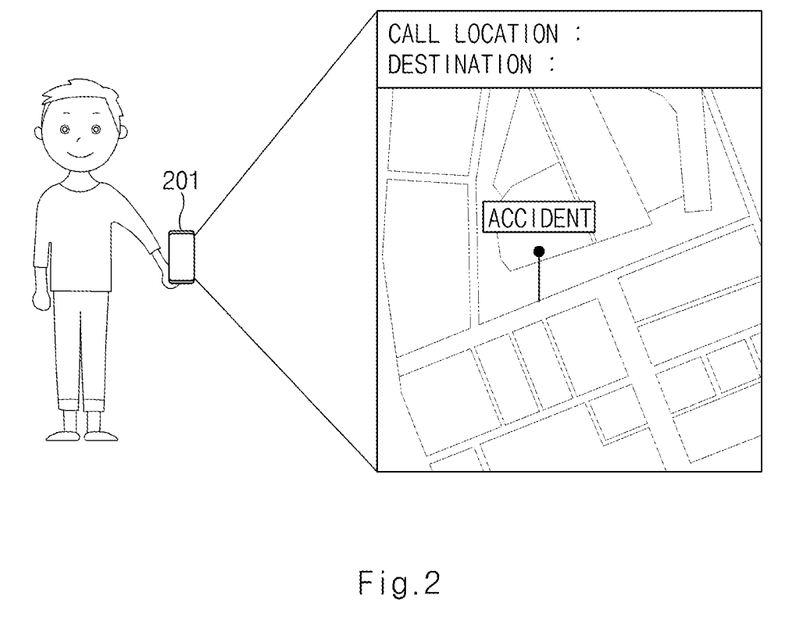
FIG. 2 is a drawing illustrating that a user calls an autonomous vehicle including an autonomous vehicle location providing apparatus according to an embodiment of the present disclosure.

FIG. 2 is a drawing illustrating that a user calls an autonomous vehicle including an autonomous vehicle location providing apparatus according to an embodiment of the present disclosure.

Referring to FIG. 2, the user may call the autonomous vehicle by means of a user's terminal 201.

As an example, the autonomous vehicle may receive a call and a call location from the user's terminal 201, by means of an application.

As an example, the user's terminal 201 may transmit the call and call location of the user and user information registered with the application to the autonomous vehicle via a server.

The user's terminal 201 may provide the user with a user interface capable of inputting information about a call location and a destination together with calling the autonomous vehicle.

As an example, the user's terminal 201 may provide a user interface capable of displaying a map based on a location of the user and inputting information about a call location or a destination by means of a pin on the map.

Furthermore, the user's terminal 201 may receive setting information about an air conditioning state of the autonomous vehicle from the user together with calling the autonomous vehicle.

As an example, the user's terminal 201 may transmit at least one of the call location, the destination of the autonomous vehicle, or the setting information about the air conditioning state of the autonomous vehicle to the autonomous vehicle.

Figure 3:
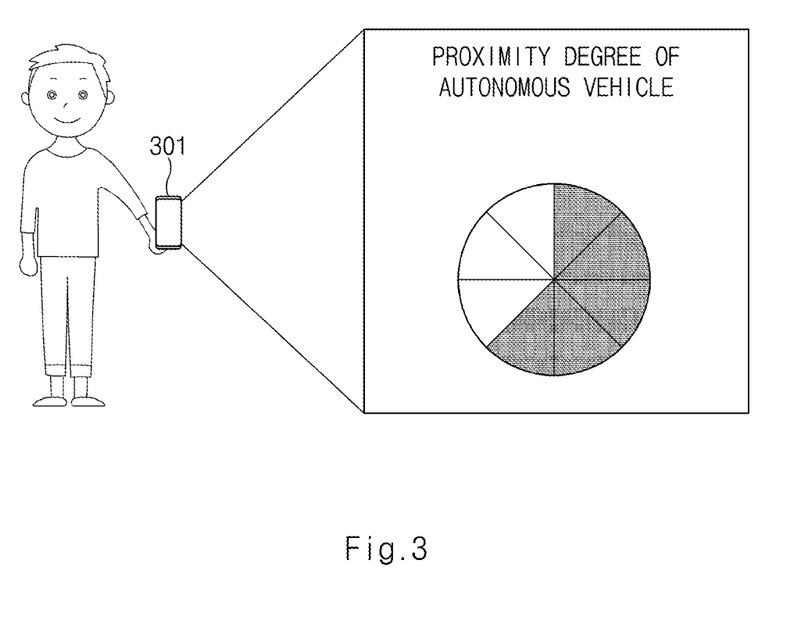
FIG. 3 is a drawing illustrating that an autonomous vehicle location providing apparatus displays information about a distance between an autonomous vehicle and a user by means of a user's terminal according to an embodiment of the present disclosure.

FIG. 3 is a drawing illustrating that an autonomous vehicle location providing apparatus displays information about a distance between an autonomous vehicle and a user by means of a user's terminal according to an embodiment of the present disclosure.

Referring to FIG. 3, an autonomous vehicle location providing apparatus 100 of FIG. 1 may display information about a distance between the autonomous vehicle and the user, by means of a user's terminal 301.

As an example, the autonomous vehicle location providing apparatus 100 may calculate a distance between the autonomous vehicle and the user based on an RSSI for communication with the user's terminal 301 via a short range communication device 120 of FIG. 1 and may transmit information about the calculated distance to the user's terminal 301 to be displayed on the user's terminal 301.

As another example the autonomous vehicle location providing apparatus 100 may transmit a command to calculate a distance between the autonomous vehicle and the user based on an RSSI for communication with the user's terminal 301 via the short range communication device 120, which is measured by the user's terminal 301, and may transmit a command to display the calculated distance to the user's terminal 301.

As an example, the autonomous vehicle location providing apparatus 100 may display a proximity degree between the autonomous vehicle and the user using a numerical value, a graph, or the like, by means of the user's terminal 301.

As an example, the autonomous vehicle location providing apparatus 100 may display a proximity degree between the autonomous vehicle and the user using a pie chart, by means of the user's terminal 301, such that the closer the autonomous vehicle and the user, the wider the area of the shadow portion.

As an example, the autonomous vehicle location providing apparatus 100 may calculate an RSSI for communication between the user's terminal 301 and the short range communication device 120 as a value between 0 and 100, by means of the user's terminal 301, and may display information about a distance between the autonomous vehicle and the user based on the calculated value between 0 and 100.

As an example, when the calculated value between 0 and 100 is greater than a predetermined threshold, the autonomous vehicle location providing apparatus 100 may turn on a dynamic welcome light of the autonomous vehicle, such that the user may find the autonomous vehicle.

Figure 4:
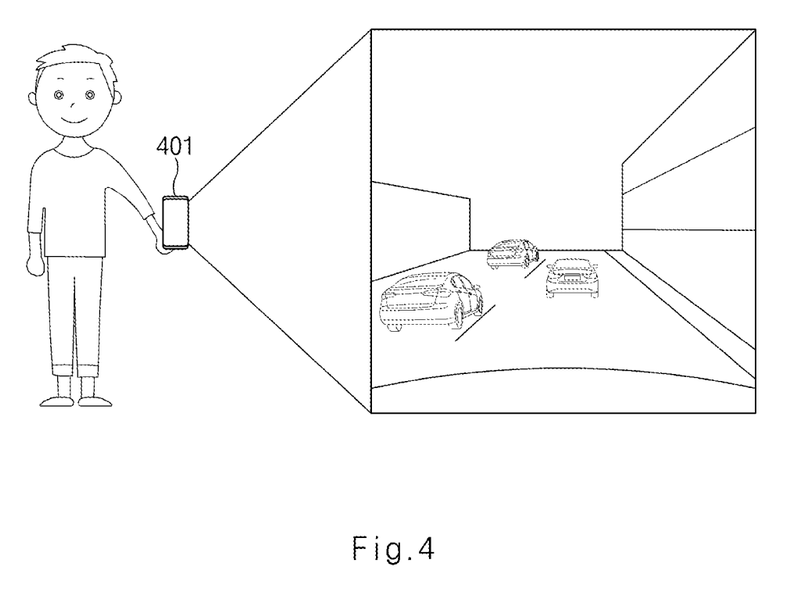
FIG. 4 is a drawing illustrating that an autonomous vehicle location providing apparatus displays a camera image of an autonomous vehicle by means of a user's terminal according to an embodiment of the present disclosure.

FIG. 4 is a drawing illustrating that an autonomous vehicle location providing apparatus displays a camera image of an autonomous vehicle by means of a user's terminal according to an embodiment of the present disclosure.

An autonomous vehicle location providing apparatus 100 may be electrically connected with a camera provided in the autonomous vehicle to receive an image obtained by means of the camera.

As an example, the camera provided in the autonomous vehicle may include at least one of a surround view monitor (SVM) camera, a digital video recording system (DVRS) camera, a camera monitor system (CMS) camera, or a line detection camera.

As an example, when an RSSI of communication with a user's terminal 401 via a short range communication device 120 of FIG. 1 is greater than a predetermined first reference value, the autonomous vehicle location providing apparatus 100 may transmit an image obtained by means of the camera provided in the autonomous vehicle and a signal for displaying the image to the user's terminal 401 via a communication device 110 of FIG. 1 or the short range communication device 120.

As an example, the user's terminal 401 may display the received image obtained by means of the camera provided in the autonomous vehicle.

The autonomous vehicle location providing apparatus 100 may display the image of the camera of the autonomous vehicle on the user's terminal 401, such that the user may accurately identify a location of the autonomous vehicle by means of the image.

Figure 5:
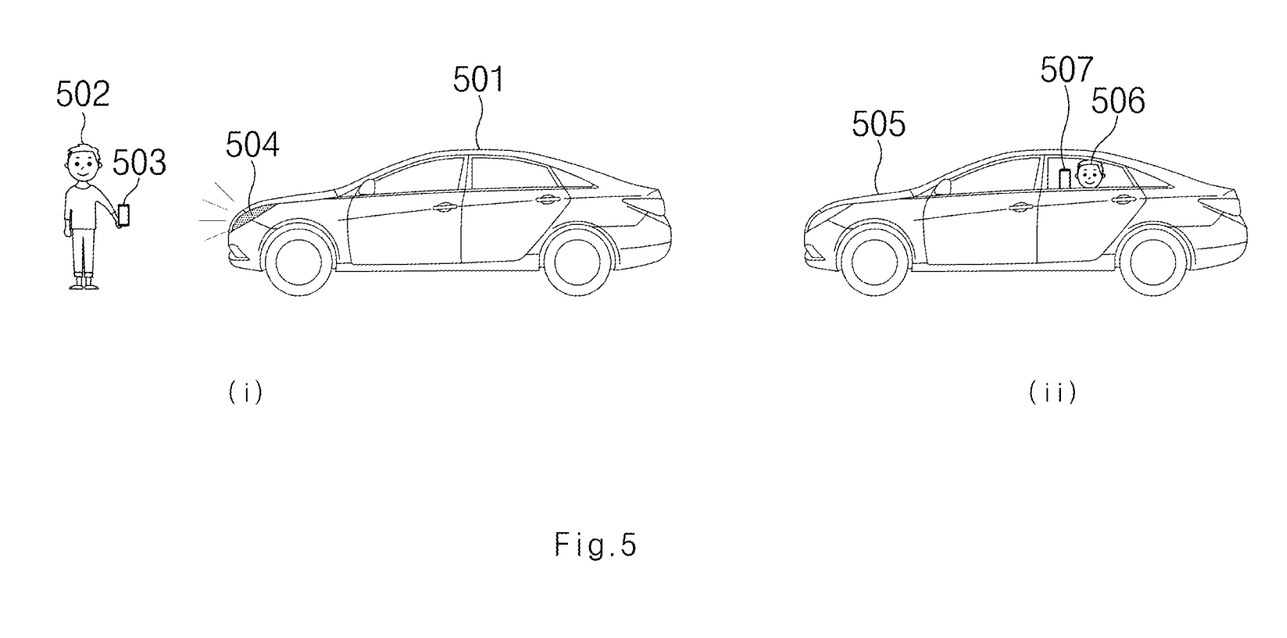
FIG. 5 is a drawing illustrating that an autonomous vehicle location providing apparatus grants control authority to a user and starts autonomous driving according to an embodiment of the present disclosure.

FIG. 5 is a drawing illustrating that an autonomous vehicle location providing apparatus grants control authority to a user and starts autonomous driving according to an embodiment of the present disclosure.

Referring to (i) of FIG. 5, when an RSSI of communication with a user's terminal 503 via a short range communication device 120 of FIG. 1 is greater than a predetermined second reference value, an autonomous vehicle location providing apparatus 100 of FIG. 1 may grant control authority of an autonomous vehicle 501 to a user 502 by means of the user's terminal 503.

Furthermore, the autonomous vehicle location providing apparatus 100 may grant the control authority of the autonomous vehicle to the user 502 by means of the user's terminal 503 and may display whether the control authority is granted, by means of turning on of a lamp 504 of the autonomous vehicle 501.

As an example, the autonomous vehicle location providing apparatus 100 may determine whether the autonomous vehicle 501 performs autonomous driving and is close to the user 502, based on whether the RSSI of the communication with the user's terminal 503 via the short range communication device 120 is greater than the predetermined second reference value.

As an example, when it is determined that the autonomous vehicle 501 is close to the user 502, the autonomous vehicle location providing apparatus 100 may grant the control authority of the autonomous vehicle to the user 502 by means of the user's terminal 503 and may simultaneously display whether the control authority is granted, by means of turning on of the lamp 504 of the autonomous vehicle 501.

(ii) of FIG. 5 is a drawing illustrating that control authority of an autonomous vehicle 505 is granted to a user 506 by means of a user's terminal 507 and that the user 506 unlocks a door lock of the autonomous vehicle 505 and rides in the autonomous vehicle 505.

When the user 506 rides in the autonomous vehicle 505 and then locks the door lock by means of the user's terminal 507, the autonomous vehicle location providing apparatus 100 may generate a command to start autonomous driving toward a destination of the autonomous vehicle 505 and may deliver the generated command to an autonomous driving system of the autonomous vehicle 505.

Figure 6:
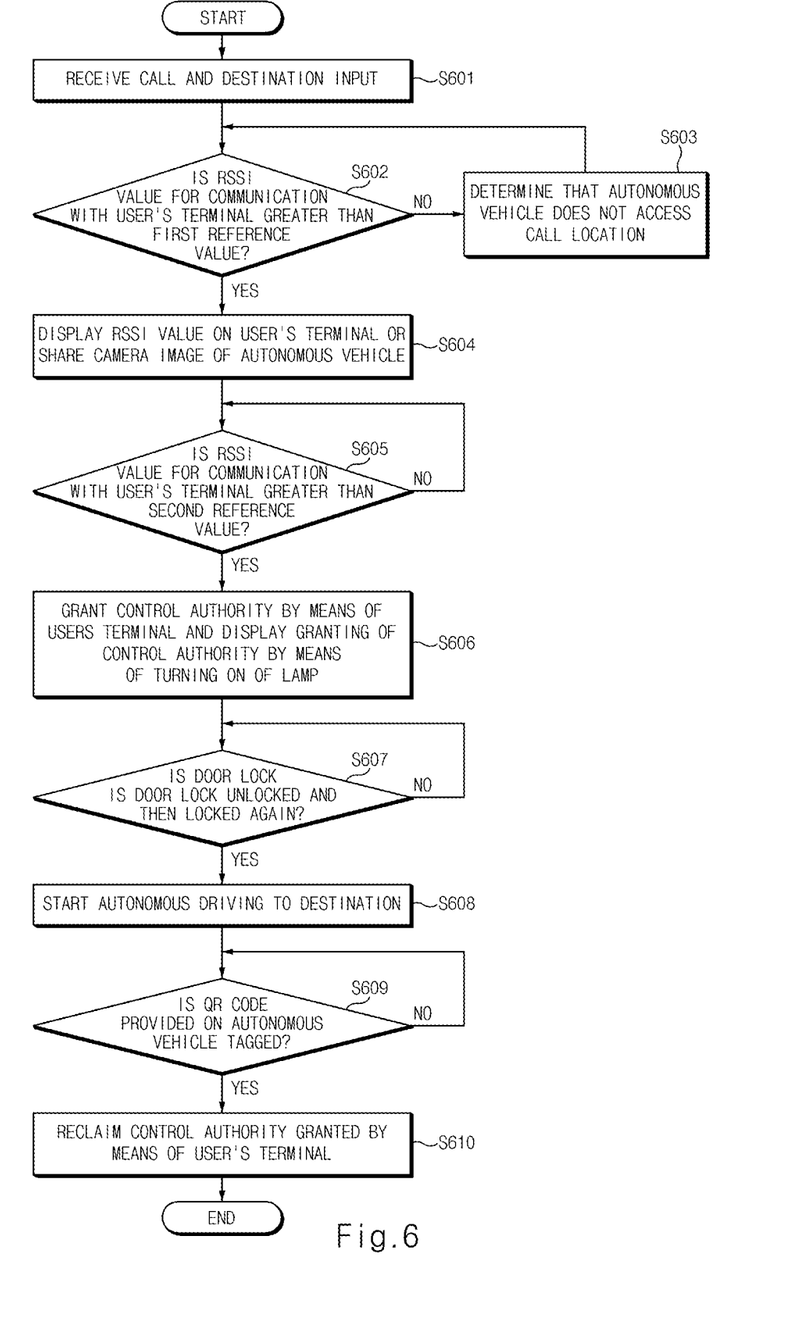
FIG. 6 is a flowchart illustrating an operation process of an autonomous vehicle location providing apparatus according to an embodiment of the present disclosure.

FIG. 6 is a flowchart illustrating an operation process of an autonomous vehicle location providing apparatus according to an embodiment of the present disclosure.

Referring to FIG. 6, in S601, an autonomous vehicle location providing apparatus 100 may receive a call and a destination input from a user's terminal.

As an example, the autonomous vehicle location providing apparatus 100 may receive a call, a call location, and a destination input from the user's terminal via a server.

After receiving the call and the destination input from the user's terminal in S601, in S602, the autonomous vehicle location providing apparatus 100 may identify whether an RSSI value for communication with the user's terminal is greater than a first reference value.

As an example, the autonomous vehicle location providing apparatus 100 may identify whether an RSSI value for communication with the user's terminal via a short range communication device 120 of FIG. 1 is greater than the first reference value.

After identifying whether the RSSI value for the communication with the user's terminal is greater than the first reference value in S602, when it is identified that the RSSI value for the communication with the user's terminal is not greater than the first reference value, in S603, the autonomous vehicle location providing apparatus 100 may determine that the autonomous vehicle does not access the call location.

After determining that the autonomous vehicle does not access the call location, the autonomous vehicle location providing apparatus 100 may return to S601 to receive a call and a destination input from the user's terminal in S601.

After identifying whether the RSSI value for the communication with the user's terminal is greater than the first reference value in S602, when it is identified that the RSSI value for the communication with the user's terminal is greater than the first reference value, in S604, the autonomous vehicle location providing apparatus 100 may display the RSSI value on the user's terminal or may share a camera image of the autonomous vehicle with the user's terminal.

As an example, the autonomous vehicle location providing apparatus 100 may receive a selection of the user through the user's terminal and may display information about a distance between the user's terminal and the autonomous vehicle, which is calculated based on the RSSI value, on the user's terminal or may display a camera image of the autonomous vehicle on the user's terminal, depending on the selection of the user.

After displaying the RSSI value on the user's terminal or sharing the camera image of the autonomous vehicle with the user's terminal in S604, in S605, the autonomous vehicle location providing apparatus 100 may identify whether the RSSI value for the communication with the user's terminal is greater than a second reference value.

After identifying whether the RSSI value for the communication with the user's terminal is greater than the second reference value in S605, when it is identified that the RSSI value for the communication with the user's terminal is not greater than the second reference value, the autonomous vehicle location providing apparatus 100 may return to S605 again to identify whether an RSSI value for communication with the user's terminal is greater than the second reference value.

After identifying whether the RSSI value for the communication with the user's terminal is greater than the second reference value in S605, when it is identified that the RSSI value for the communication with the user's terminal is greater than the second reference value, in S606, the autonomous vehicle location providing apparatus 100 may grant control authority to the user by means of the user's terminal and may display the granting of the control authority by means of turning on of the lamp of the autonomous vehicle.

After granting the control authority to the user by means of the user's terminal and displaying the granting of the control authority by means of the turning on of the lamp of the autonomous vehicle in S606, in S607, the autonomous vehicle location providing apparatus 100 may identify whether a door lock of the autonomous vehicle is unlocked and then locked again.

As an example, the autonomous vehicle location providing apparatus 100 may identify whether the door lock is unlocked and then locked again by the user, by means of the user's terminal.

After identifying whether the door lock of the autonomous vehicle is unlocked and then locked again in S607, when it is identified that the door lock of the autonomous vehicle is unlocked and is not locked again, the autonomous vehicle location providing apparatus 100 may return to S607 to identify whether the door lock of the autonomous vehicle is unlocked and then locked again.

After identifying whether the door lock of the autonomous vehicle is unlocked and then locked again in S607, when it is identified that the door lock of the autonomous vehicle is unlocked and then locked again, in S608, the autonomous vehicle location providing apparatus 100 may start autonomous driving of the autonomous vehicle to a destination.

When it is identified that the door lock of the autonomous vehicle is unlocked and then locked again, the autonomous vehicle location providing apparatus 100 may determine that the user rides in the autonomous vehicle to start autonomous driving of the autonomous vehicle to the destination.

After starting the autonomous driving of the autonomous vehicle to the destination in S608, in S609, the autonomous vehicle location providing apparatus 100 may identify whether a QR code provided on the autonomous vehicle is tagged.

As an example, the autonomous vehicle location providing apparatus 100 may identify whether the QR code provided on outside of the autonomous vehicle is tagged by means of an application of the user's terminal.

After identifying whether the QR code provided on the autonomous vehicle is tagged in S609, when it is identified that the QR code provided on the autonomous vehicle is not tagged, the autonomous vehicle location providing apparatus 100 may return to S609 again to identify whether the QR code provided on the autonomous vehicle is tagged.

After identifying whether the QR code provided on the autonomous vehicle is tagged in S609, in S610, when it is identified that the QR code provided on the autonomous vehicle is tagged, the autonomous vehicle location providing apparatus 100 may reclaim the control authority granted to the user by means of the user's terminal.

As an example, when it is identified that the QR code provided on the autonomous vehicle is tagged, the autonomous vehicle location providing apparatus 100 may determine that the user alights from the autonomous vehicle to reclaim the control authority granted to the user by means of the user's terminal.

Figure 7:
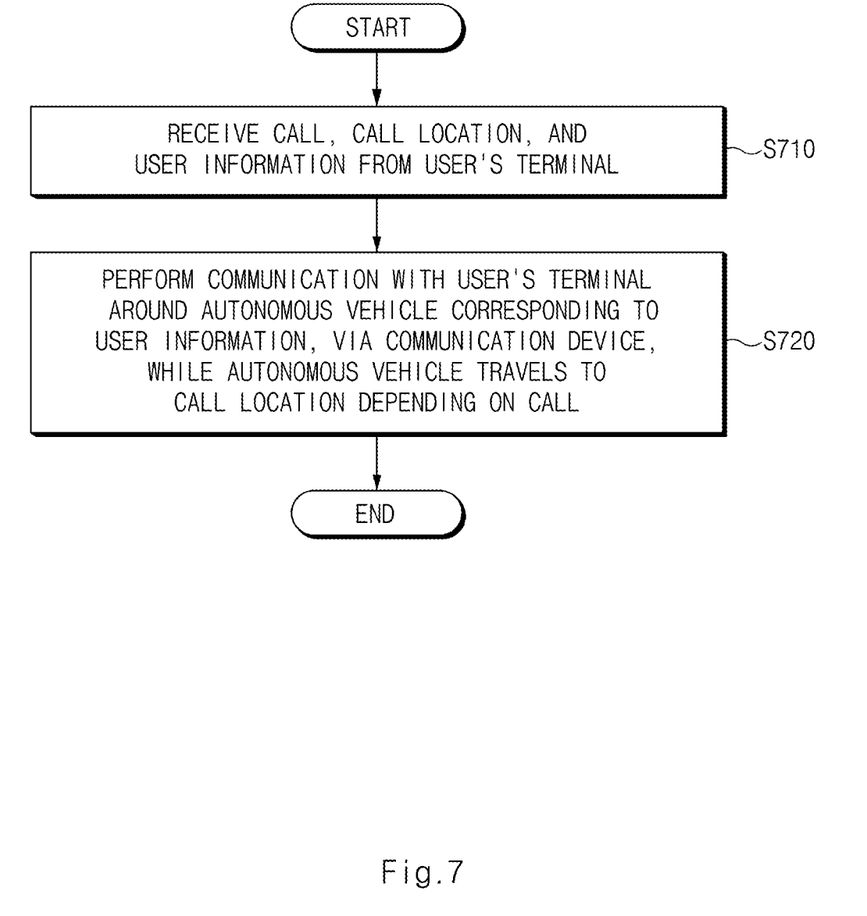
FIG. 7 is a flowchart illustrating an autonomous vehicle location providing method according to an embodiment of the present disclosure.

FIG. 7 is a flowchart illustrating an autonomous vehicle location providing method according to an embodiment of the present disclosure.

Referring to FIG. 7, the autonomous vehicle location providing method may include receiving (S710) a call, a call location, and user information from a user's terminal and communicating (S720) with the user's terminal around an autonomous vehicle corresponding to the user information via a short range communication device 120, while the autonomous vehicle travels to the call location depending on the call.

The receiving (S710) of the call, the call location, and the user information from the user's terminal may be performed via a communication device 110 of FIG. 1.

As an example, the receiving (S710) of the call, the call location, and the user information from the user's terminal may include receiving, by the communication device 110, air conditioning state setting information of the autonomous vehicle together with the call from the user's terminal.

The communicating (S720) with the user's terminal around the autonomous vehicle corresponding to the user information via the short range communication device 120, while the autonomous vehicle travels to the call location depending on the call, may be performed through a process where a controller 130 of FIG. 1 delivers a control command to the short range communication device 120.

As an example, the autonomous vehicle location providing method may further include displaying, by the controller 130, information about a distance between the autonomous vehicle and a user, which is calculated based on an RSSI of communication with the user's terminal via the short range communication device 120, on the user's terminal.

As an example, the autonomous vehicle location providing method may further include displaying, by the controller 130, an image obtained by means of a camera provided in the autonomous vehicle on the user's terminal, when the RSSI of the communication with the user's terminal via the short range communication device 120 is greater than a predetermined first reference value.

As an example, the autonomous vehicle location providing method may further include granting, by the controller 130, control authority of the autonomous vehicle to the user by means of the user's terminal, when the RSSI of the communication with the user's terminal via the short range communication device 120 is greater than a predetermined second reference value.

As an example, the autonomous vehicle location providing method may further include granting, by the controller 130, control authority of the autonomous vehicle to the user by means of the user's terminal and displaying, by the controller 130, whether the control authority is granted, by means of turning on of a lamp of the autonomous vehicle.

As an example, the autonomous vehicle location providing method may further include starting, by the controller 130, autonomous driving of the autonomous vehicle to a destination, when a door lock of the autonomous vehicle is unlocked by means of the user's terminal and is then locked again.

As an example, the autonomous vehicle location providing method may further include reclaiming, by the controller 130, the control authority granted to the user, when a QR code provided on the autonomous vehicle is tagged by means of the user's terminal, after the autonomous vehicle arrives at the destination.

As an example, the autonomous vehicle location providing method may further include controlling, by the controller 130, air conditioning of the autonomous vehicle based on air conditioning state setting information received while the autonomous vehicle travels to the call location depending on the call.

The operations of the method or the algorithm described in connection with the embodiments disclosed herein may be embodied directly in hardware or a software module executed by the processor or in a combination thereof. The software module may reside on a storage medium (that is, the memory/or the storage) such as a RAM, a flash memory, a ROM, an EPROM, an EEPROM, a register, a hard disk, a removable disk, and a CD-ROM.

The exemplary storage medium may be coupled to the processor, and the processor may read information out of the storage medium and may record information in the storage medium. Alternatively, the storage medium may be integrated with the processor. The processor and the storage medium may reside in an application specific integrated circuit (ASIC). The ASIC may reside within a user terminal. In another case, the processor and the storage medium may reside in the user terminal as separate components.

A description will be given of effects of the autonomous vehicle location providing apparatus and the method thereof according to an embodiment of the present disclosure.

According to at least one of embodiments of the present disclosure, the apparatus and the method may be provided to provide a location of an autonomous vehicle which travels to a location of a user depending on a call of the user.

Furthermore, according to at least one of embodiments of the present disclosure, the autonomous vehicle location providing apparatus and the method thereof are provided to recognize a customer who calls an auto-taxi.

Furthermore, according to at least one of embodiments of the present disclosure, the autonomous vehicle location providing apparatus and the method thereof are provided to overcome immaturity of the user in conjunction with setting the called autonomous vehicle.

Furthermore, according to at least one of embodiments of the present disclosure, the autonomous vehicle location providing apparatus and the method thereof are provided to address a problem, when an error occurs in identifying a location of the user due to movement of the user, an error in GPS information, or the like.

Furthermore, according to at least one of embodiments of the present disclosure, the autonomous vehicle location providing apparatus and the method thereof are provided to accurately identify a service end time, when the user ends the use of the called autonomous vehicle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An autonomous vehicle location providing apparatus, comprising:
   a communication device configured to be provided in an autonomous vehicle and receive a call, a call location, and user information from a user's terminal;
   a short range communication device configured to be provided in the autonomous vehicle and communicate with the user's terminal when the user's terminal is within a specific distance of the autonomous vehicle; and
   a controller configured to perform communication with the user's terminal corresponding to the user information, via the short range communication device, while the autonomous vehicle travels to the call location depending on the call.

2. The autonomous vehicle location providing apparatus of claim 1, wherein the short range communication device communicates with the user's terminal when the user's terminal is within a specific distance of the autonomous vehicle, by means of Bluetooth or Bluetooth low energy.

3. The autonomous vehicle location providing apparatus of claim 1, wherein the controller displays information about a distance between the autonomous vehicle and a user, the distance being calculated based on a received signal strength indicator (RSSI) of the communication with the user's terminal via the short range communication device, on the user's terminal.

4. The autonomous vehicle location providing apparatus of claim 1, wherein the controller displays an image obtained by the autonomous vehicle on the user's terminal, when an RSSI of the communication with the user's terminal via the short range communication device is greater than a predetermined first reference value.

5. The autonomous vehicle location providing apparatus of claim 1, wherein the controller transmits a notification to a server which manages a call of the autonomous vehicle, via the communication device, when the call location and a global position system (GPS)-based location of the user's terminal are determined to differ from each other depending on a predetermined criterion.

6. The autonomous vehicle location providing apparatus of claim 1, wherein the controller grants control authority of the autonomous vehicle to a user by means of the user's terminal, when an RSSI of the communication with the user's terminal via the short range communication device is greater than a predetermined second reference value.

7. The autonomous vehicle location providing apparatus of claim 6, wherein the controller grants the control authority of the autonomous vehicle to the user by means of the user's terminal and displays whether the control authority is granted, by means of turning on of a lamp of the autonomous vehicle.

8. The autonomous vehicle location providing apparatus of claim 6, wherein the controller starts autonomous driving of the autonomous vehicle to a destination, when a door lock of the autonomous vehicle is unlocked by means of the user's terminal and is then locked again.

9. The autonomous vehicle location providing apparatus of claim 6, wherein the controller reclaims the control authority granted to the user, when a quick response (QR) code provided on the autonomous vehicle is tagged by means of the user's terminal, after the autonomous vehicle arrives at a destination.

10. The autonomous vehicle location providing apparatus of claim 8, wherein the controller changes a color of a mood lamp provided in the autonomous vehicle, depending on the locking of the door lock or the starting of the autonomous driving.

11. The autonomous vehicle location providing apparatus of claim 1, wherein the communication device receives air conditioning state setting information of the autonomous vehicle together with the call from the user's terminal, and
wherein the controller controls air conditioning of the autonomous vehicle, based on the received air conditioning state setting information, while the autonomous vehicle travels to the call location depending on the call.

12. The autonomous vehicle location providing apparatus of claim 6, wherein the control authority includes at least one of locking of a door lock of the autonomous vehicle, unlocking of the door lock, an alarm output, navigation control, control of a vehicle interior temperature, or music playback.

13. An autonomous vehicle location providing method, comprising:
receiving, by a communication device provided in an autonomous vehicle, a call, a call location, and user information from a user's terminal; and
performing, by a controller, communication with the user's terminal corresponding to the user information, via a short range communication device, while the autonomous vehicle travels to the call location depending on the call.

14. The autonomous vehicle location providing method of claim 13, further comprising:
displaying, by the controller, information about a distance between the autonomous vehicle and a user, the distance being calculated based on an RSSI of the communication with the user's terminal via the short range communication device, on the user's terminal.

15. The autonomous vehicle location providing method of claim 13, further comprising:
displaying, by the controller, an image obtained by the autonomous vehicle on the user's terminal, when an RSSI of the communication with the user's terminal via the short range communication device is greater than a predetermined first reference value.

16. The autonomous vehicle location providing method of claim 13, further comprising:
granting, by the controller, control authority of the autonomous vehicle to a user by means of the user's terminal, when an RSSI of the communication with the user's terminal via the short range communication device is greater than a predetermined second reference value.

17. The autonomous vehicle location providing method of claim 16, further comprising:
granting, by the controller, the control authority of the autonomous vehicle to the user by means of the user's terminal and displaying whether the control authority is granted, by means of turning on of a lamp of the autonomous vehicle.

18. The autonomous vehicle location providing method of claim 16, further comprising:
starting, by the controller, autonomous driving of the autonomous vehicle to a destination, when a door lock of the autonomous vehicle is unlocked by means of the user's terminal and is then locked again.

19. The autonomous vehicle location providing method of claim 16, further comprising:
reclaiming the control authority granted to the user, when a QR code provided on the autonomous vehicle is tagged by means of the user's terminal, after the autonomous vehicle arrives at a destination.

20. The autonomous vehicle location providing method of claim 13, wherein the receiving of the call, the call location, and the user information from the user's terminal by the communication device includes:
receiving, by the communication device, air conditioning state setting information of the autonomous vehicle together with the call from the user's terminal,
further comprising:
controlling, by the controller, air conditioning of the autonomous vehicle, based on the received air conditioning state setting information, while the autonomous vehicle travels to the call location depending on the call.

* * * * *